United States Patent [19]
Renk et al.

[11] 3,940,189
[45] Feb. 24, 1976

[54] TRACTION MOTOR BEARING LUBRICATION ASSEMBLY

[75] Inventors: Richard J. Renk; George F. Boller, both of Winona, Minn.

[73] Assignee: Gladys D. Miller, Winona, Minn.

[22] Filed: Mar. 6, 1975

[21] Appl. No.: 556,129

[52] U.S. Cl............ 308/132; 308/36.1; 308/87 R; 308/108; 308/240
[51] Int. Cl.² B61F 17/08; F16C 1/23; F16C 33/10; F16C 33/66
[58] Field of Search....... 308/36.1, 87 R, 88 R, 108, 308/240

[56] References Cited
UNITED STATES PATENTS

| | | | |
|---|---|---|---|
| 1,191,730 | 7/1916 | Quigley | 308/240 |
| 2,954,263 | 9/1960 | Kalny | 308/36.1 |
| 2,980,471 | 4/1961 | Harkenrider | 308/132 |
| 2,980,472 | 4/1961 | Harkenrider | 308/132 |
| 3,254,925 | 6/1966 | Cox | 308/36.1 |

Primary Examiner—M. Henson Wood, Jr.
Assistant Examiner—Howard Beltran
Attorney, Agent, or Firm—Richard J. Renk

[57] ABSTRACT

A traction motor suspension bearing and assembly wherein a bearing liner having grooves cooperating with a member on an axle surface to restrict lubricant losses.

25 Claims, 6 Drawing Figures

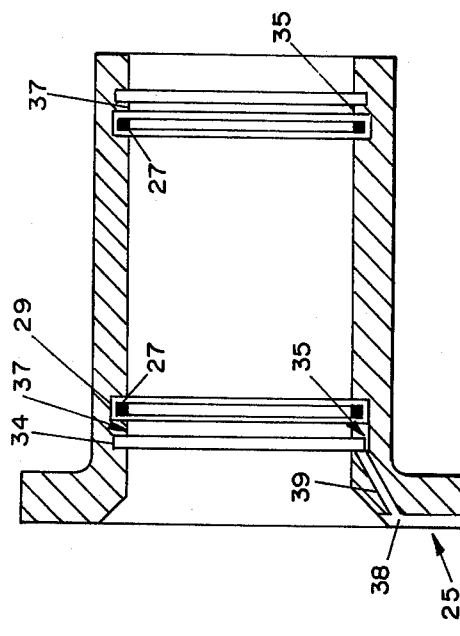
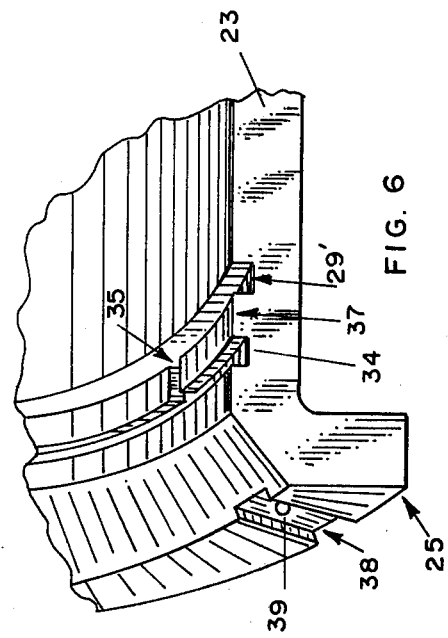
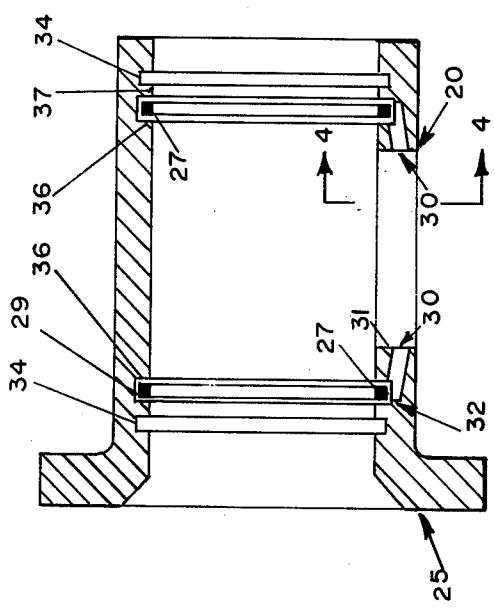
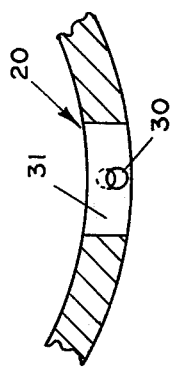

TRACTION MOTOR BEARING LUBRICATION ASSEMBLY

BACKGROUND OF INVENTION

The present application is an improvement of the concepts shown in U.S. Pat. No. 3,905,659 filed Apr. 16, 1973, and divisional application Ser. No. 518,475 filed Oct. 29, 1974, and relates to traction motor suspension bearing lubrication as may be found in diesel and electric locomotives such as described in U.S. Pat. Nos. 2,980,472 and 3,254,925.

Suspension bearings of this type are used to support part of the weight of a driving electric traction motor on an axle of a locomotive. Lubrication is supplied to the suspension bearing by means of a lubricator.

Because of the critical nature of the suspension bearing, it is important that the supply of lubricant be conserved and that dirt and brake shoe dust be kept out of the bearing area. However, up to this time, this has been difficult to accomplish because of the many variables involved such as cocking of the suspension bearings (and traction motor) relative to the axle, because of gear reaction forces, because of lateral movement between the suspension bearings and the axle, and because of variances in clearances between the axle and the bearings.

SUMMARY OF INVENTION

The present invention provides an arrangement wherein the lubricant is restricted in its flow outwardly of the suspension bearing and is returned to the lubricant reservoir. This is accomplished by the use of a member such as a ring or series of rings which engage a circular surface and rotate in and cooperate with a groove(s) in the support bearing to reduce lubricant losses and return lubricant to the reservoir.

DESCRIPTION OF DRAWINGS

FIG. 3 is a sectional view of the whole bearing taken through the window along lines 3—3 of FIG. 2.

FIG. 4 is a view of the oil drain passage into the window as viewed along lines 4—4 of FIG. 3.

FIG. 5 is a sectional view taken along lines 5—5 of FIG. 2 showing an embodiment for providing lubricant to the bearing flange.

FIG. 6 is an enlarged perspective view of a small portion of the bearing showing the various lubricant grooves.

PREFERRED EMBODIMENTS

Figure 2:
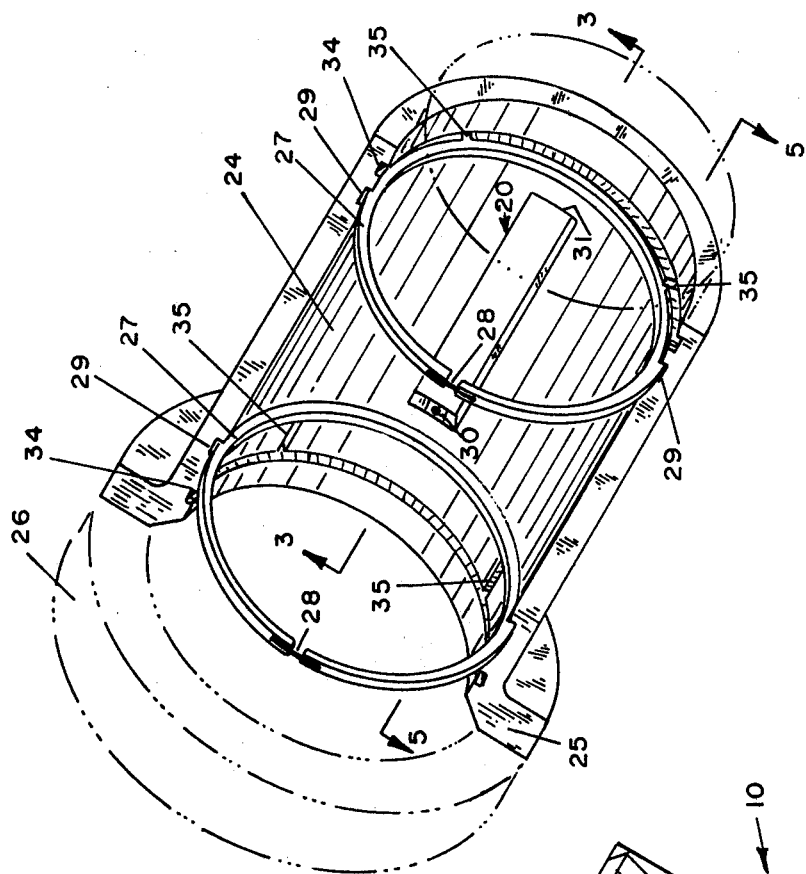
FIG. 2 is a perspective view showing one half of a split suspension bearing with one arrangement of the invention in position relative to a phantom axle.

In the drawings, numeral 10 generally indicates a typical traction motor suspension bearing assembly. The assembly includes a split bearing liner or shell 11 which surrounds an axle or shaft 12. Bearing 11 is held in position against the axle 12 by a portion of the traction motor casting 13 and by an axle cap 14 through bolts 15.

Lubricant is applied to the journal portion 16 of the axle 12 by a lubricator 17 which serves to lift a lubricant such as oil from the axle cap reservoir 18 and apply it to the journal through a generally rectangular window opening 19 in the axle cap and a corresponding window 20 in the bearing 11. In a typical application, the window opens or faces downwardly toward the reservoir 18 at about 30° from the horizontal.

Figure 1:
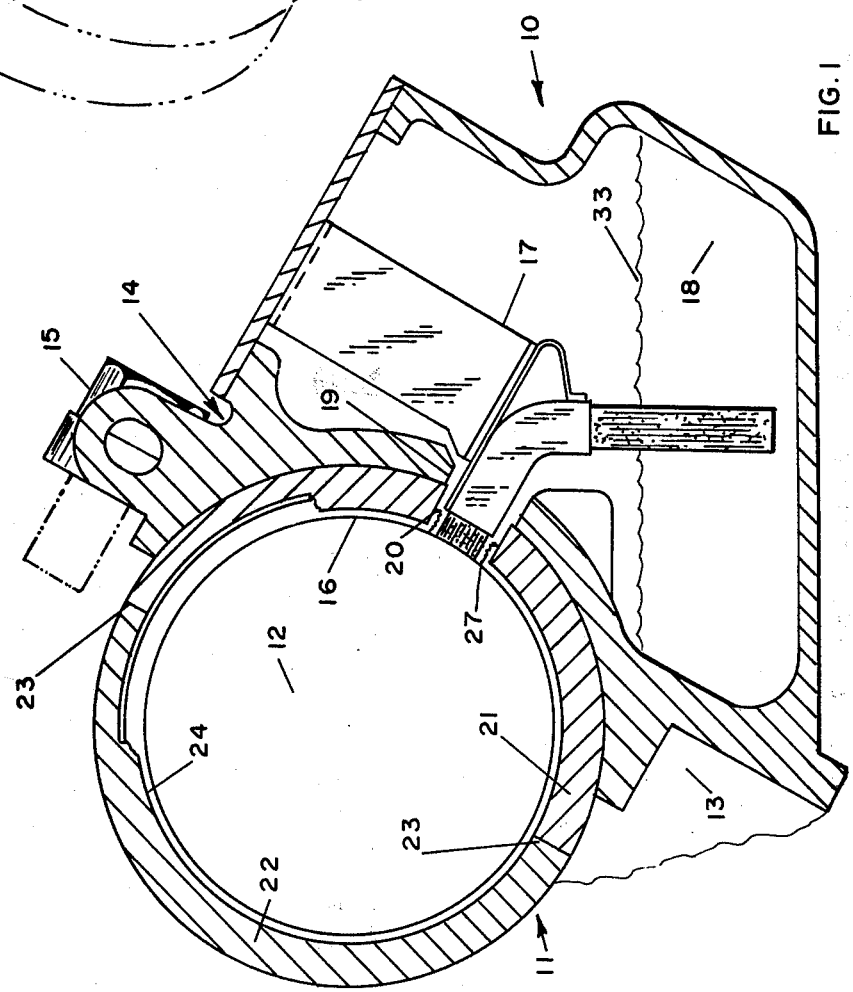
FIG. 1 is a fragmentary vertical section through a traction motor suspension bearing, axle cap and lubricator, embodying the features of the invention.

The bearing 11 is of the sleeve type and formed of two complimentary halves or segments 21 and 22 (FIG. 1), which meet one another at a split line 23. The window 20 is in the bearing half 21. The two bearing halves have a common axial bearing surface or bore 24 which bears against the journal or axle. A thrust flange face 25 (FIG. 2) of the bearing is adapted to engage either a wheel hub or gear hub indicated by phantom lines at 26.

Because of the variables of traction motor lateral, axle movement, bore clearances, and axle and bearing misalignment, lubricant retention within the suspension bearing assembly has been very difficult.

In service, lubricant which is applied to the journal 16 by the lubricator 17 is eventually squeezed axially outwardly toward both ends of the bearing and is lost. To reduce such losses, in accordance with the invention disclosed in the before noted U.S. Pat. No. 3,905,659, there is provided a member(s) 27 (FIGS. 2 & 3) which returns lubricant to the reservoir 18 after it reaches a predetermined position in the bearing bore where it no longer serves to lubricate the bearing load zone.

As shown in FIG. 2, the member 27, which may be in the form of a ring, is held on the journal by the clamping effect developed by a retaining or biasing member such as a tension spring 28. The ring 27 thus rotates with the journal in a recessed groove 29 formed circumferentially in the periphery of the bearing surface which opens inwardly toward the journal 16. To permit rotation of the ring, the groove 29 is larger than the ring 27 in both the axial and outer peripheral dimensions.

Oil which works outwardly into a ring groove 29 (i.e. away from the window load zone toward the ends of the bearing) is carried or moved by a rotating ring 27 and deposited in a passage or drain 30 (FIGS. 2 and 3) which communicates between the bearing window 20 and a ring groove 29 (FIGS. 2–4). The passage 30 may be a substantially enclosed bore which extends from a generally vertically disposed side 31 of the bearing window 20 and intersects the ring groove 29 as at 32 (FIG. 3). Preferably the passage 30 extends below the outer periphery 29' or bottom of the groove 29 (FIG. 3) but breaks out into the groove as at 32 for good lubricant collection. The oil then runs through the window drain 30, through the axle cap window 19, and thence into the reservoir 18 wherein the maximum oil level 33 (FIG. 1) is below the window 19. To aid the flow of oil downwardly, the passage 30 may have a taper or pitch with a vertical component as shown in FIGS. 3 and 4.

Now, in accordance with the present invention, it has been found that a further substantial reduction in lubricant losses can be achieved by incorporating an additional collector groove 34 axially outwardly of a ring groove 29. In other words, the collector groove 34 (second groove) is closer to an end of the bearing than its adjacent and associated ring groove 29 (first groove).

The ring groove 29 and its adjacent collector groove 34 are connected by suitable means, such as a transfer channel or slot 35 (FIGS. 2 & 6), to allow oil which enters the collector groove 34 to move the ring groove 29. Such oil can then be moved by the ring member 27 to the passage or drain 30. As shown in FIGS. 2 and 6, a very desireable position for the transfer channel 35 is at the bottommost part of the groove, or, at about the six o'clock position.

In operation, lubricant which passes the ring 27 and its groove 29 enters the collector groove 34 and runs downwardly to the 6 o'clock position to the bottommost transfer channel 35. It then runs laterally in the channel 35 to the ring groove 29 and is moved upwardly to the window drain 30 by the rotating ring 27. Using the collector groove 34 and transfer channel 35, oil losses have been reduced by as much as an additional factor of 10:1.

In a typical installation, a ring groove 29 (first groove) an a collector groove 34 (second groove) can be positioned on each side of the bearing window 20 as shown in FIG. 2. However, in some installations where an excess of oil might be desired at the bearing flange 25, the collector groove 34 adjacent the flange can be eliminated.

In most applications, the traction motor is designed to allow for lateral movement between the axle 12 and the bearings 11 (which are fixedly secured to the motor). Lateral movement is generally between 1/16 inch to 5/16 inch. To accommodate such movement and to keep any sliding or rubbing action of the rotating ring 27 against the ring groove sidewalls 36 (FIG. 3) to a minimum, the ring groove 29 may be formed wider (in an axial direction) than the ring 27. In other words, if the axial width of the ring is ¼ inch, the width of the groove may be 9/16 inch etc. In a radial direction, a ring thickness of ¼ inch with a minimum clearance of 0.030 inch between the bottom of the groove 29' and the ring have been found acceptable.

A satisfactory arrangement for the collector groove 34 is to have such groove spaced about 3/16 inch from the ring groove 29 as at 37 (FIG. 3 & 6), with the width of the collector groove being approximately ¼ inch. However, other spacings and widths have been used efficiently.

During running, the ring(s) 27 rotates with the journal with no contact with the groove 29 even though the traction motor with its attached bearings may move from side to side. However, contact of the ring 27 against the side walls 36 of the grooves 29 is easily accommodated as the ring is cammed or moved slightly along the journal to provide a self centering action. As a further advantage, the ring spring 28 also allows the ring to slip on the journal if the ring is restrained from moving. In other words, it provides a slip-clutch effect.

If bearings incorporating the features of the invention are to be used in locomotive traction motors wherein they are interchangeably used in the pinion or commutator bearing positions (reversed end for end), the transfer channels 35 may be positioned at the "six" and "two" o'clock positions. When the bearing shown in FIG. 2 is inverted to be used in the opposite bearing position, the transfer channel 35 at the two o'clock position will then be at the six o'clock position (and viz).

As another feature, as shown in FIGS. 5 and 6, when additional lubricant flow to the bearing flange face 25 is desireable, a felt wick (not shown) is positioned in a cut-out notch 38 in the flange face and a opening 39 drilled upwardly through the flange so as to intersect the adjacent collector groove 34. Some of the lubricant from the collector groove can then feed to the wick in the cut-out 38. A felt plug or other media might be used in the opening 39 to provide reduced oil flow. Preferably, the opening 39 intersects the collector groove 34 directly opposite the transfer channel 35 although the position may be varied. Likewise, while the opening 39 is shown to be drilled, it can also be an open trough with some means of restricting lubricant flow. Also, where additional oil is required at the flange, the opening 39 can be connected to a ring groove 29.

While the window drain passages 30 have been shown to be centered with respect to the vertical sides 31 of the window 20, they can be at other locations around the ring grooves 29 so as to drain the oil outwardly from the bearing body. In such case, for example, a complimentary registering drain passage might be provided in the axle cap casting to allow drainage into the reservoir 18. Of course, several drain passages in each side of the window may be used, or a series of drains in other positions of the ring groove may be used. Likewise, while an enclosed drain passage 30 has been shown, a open trough-type passage cut in the bearing bore (similar in shape to channel 35) opening toward the journal could be used to connect the window and the ring groove, or a passage on the back of the bearing between the axle cap and the bearing could be used. Moreover, while only one collector groove is shown in conjunction with a ring groove, additional collector grooves can be used.

What we claim is:

1. A bearing for use with a traction motor suspension assembly wherein a member is carried on the axle to reduce the oil losses through said bearing comprising,
   a bearing body having an arcuate bearing surface defining an axial sleeve portion adapted to engage a surface of said axle,
   said bearing body having a first recessed groove formed circumferentially in the periphery of said bearing surface into which said member extends and is rotated with said axle,
   a passage communicating with said first groove, said passage being located to allow excess lubricant which enters said first groove to be moved into said passage by rotation of said member with said axle,
   a second recessed groove in the periphery of said bearing surface, and,
   means connecting said second groove with said first groove to allow excess lubricant from said second groove to move to said first groove.

2. A bearing as claimed in claim 1 wherein said bearing has a window opening therein, and wherein said passage extends from said first groove to the opening provided by said window.

3. A bearing as claimed in claim 2, wherein said first groove is positioned outwardly of said window and said second groove is positioned outwardly of said first groove.

4. A bearing as claimed in claim 2 wherein a first groove is positioned on opposite sides of said window.

5. A bearing as claimed in claim 1 wherein said passage is formed as a enclosed bore within said bearing and allows lubricant to move away from said first groove.

6. A bearing as claimed in claim 1 wherein said first groove is wider than said member to allow said member to move axially within said bearing body.

7. A bearing as claimed in claim 1 wherein said connecting means between said second groove and said first groove is disposed at approximately the six o'clock position of said bearing.

8. A bearing as claimed in claim 1 wherein said bearing is of the split type and includes a pair of complementary bearing segments.

9. A bearing as claimed in claim 8 wherein one of said bearing segments has a generally rectangular window opening therein, and said passage extends into a vertically disposed side of said window.

10. A bearing as claimed in claim 1 wherein the bearing has thrust flange and means are provided for transferring lubricant from a groove to said flange.

11. A bearing as claimed in claim 10 wherein an enclosed opening extends through the flange to a groove.

12. A bearing as claimed in claim 10 wherein the means for transferring lubricant to the flange is close to the six o'clock position of the flange.

13. A bearing as claimed in claim 1 wherein said passage communicates with said first groove at a point above the bottommost part of said first groove.

14. A bearing comprising,
a arcuate bearing surface sized to engage a journal,
a first groove in which a rotating member may move during rotation of a journal,
a passage communicating with said first groove to allow a lubricant to be moved away from said groove and into said passage by said member during rotation thereof,
a second groove, and
means connecting said second groove to said first groove so lubricant collecting in said second groove can move into said first groove and be moved by said member into said passage.

15. An assembly comprising,
a rotatable shaft,
a bearing mounted in supporting relation with respect to said shaft, said bearing having a first groove and a second groove therein opening toward said shaft,
a passage communicating with said first groove through which lubricant can move,
means carried by said shaft which extends beyond the diameter of said shaft and into said first groove, said means rotating with said shaft to move lubricant in said first groove toward said passage, and
means connecting said first groove to said second groove to aid in returning lubricant from said said second groove to said first groove.

16. An assembly as claimed in claim 15 wherein said passage connects to said first groove at a point above the bottom-most part of said first groove.

17. An assembly as claimed in claim 15 wherein said first groove is wider than said means carried by the shaft so as to allow said means and shaft to move laterally with respect to said bearing.

18. An assembly as claimed in claim 15 wherein said means carried by said shaft may slip on said shaft.

19. An assembly as claimed in claim 15 wherein said bearing has a window opening therein through which said lubricant is applied to said axle, and wherein said passage extends from said first groove to the opening provided by said window.

20. An assembly as claimed in claim 15 wherein said means carried by said shaft encircles said shaft and is resiliently held on said shaft.

21. An assembly as claimed in claim 15 wherein said first and second grooves are spaced from one another, are recessed in said bearing, extend circumferentially along the internal periphery of said bearing and open toward said shaft.

22. An assembly as claimed in claim 15 wherein said means connecting said first groove to said second groove is in the form of a channel.

23. An assembly as claimed in claim 15 wherein said bearing is provided with a thrust flange, and means are provided to bring oil from a groove to said thrust flange.

24. An assembly as claimed in claim 15 wherein said bearing is provided with a window and wherein said first groove is disposed axially from said window and said second groove is spaced axially outwardly from said first groove.

25. In combination in an assembly for traction motors,
an axle,
a bearing,
an axle cap having a lubricant reservoir therein mounted to aid in holding said bearing in contact with said axle,
both said bearing and said axle cap having window openings therein which generally register with one another and open to said reservoir,
said bearing having a circumferential first groove in the bore thereof and a passage communicating between said groove and said reservoir.
said bearing also having a second circumferential groove positioned axially outwardly of said first groove and means connecting said first and second grooves together to allow lubricant collecting in said second groove to move into said first groove, and
a member carried by said axle and extending into said first groove to aid in moving lubricant from said first groove to said passage and thence to said lubricant reservoir as said member is rotated by said axle.

* * * * *